J. B. STROUD.
TIRE OR CASING SPREADING TOOL.
APPLICATION FILED AUG. 9, 1916.
1,211,005.
Patented Jan. 2, 1917.
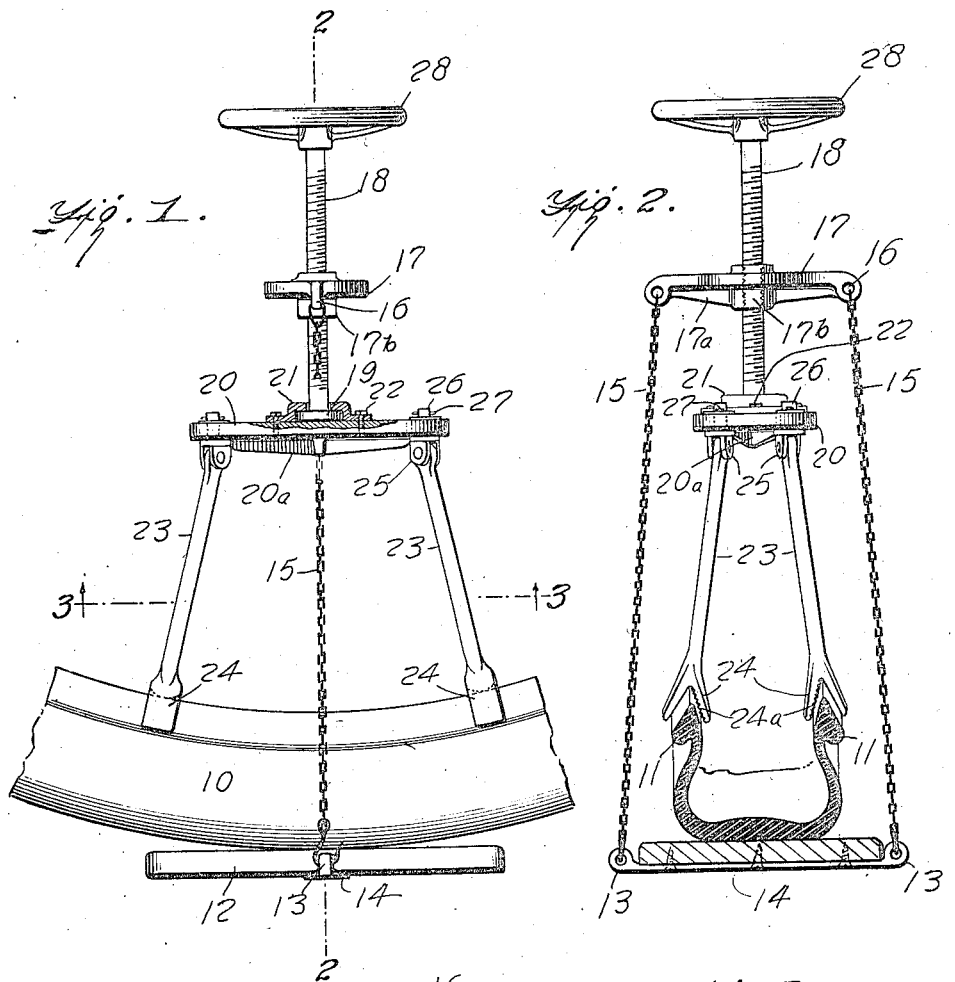
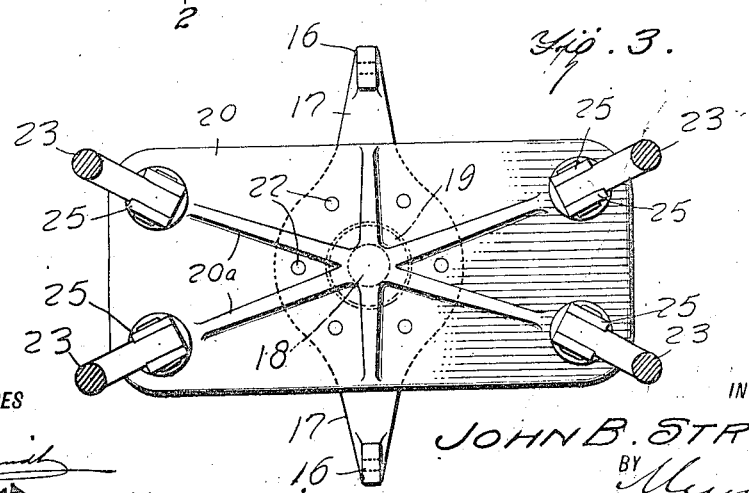
WITNESSES
INVENTOR
John B. Stroud,
BY
ATTORNEYS

UNITED STATES PATENT OFFICE.

JOHN BELL STROUD, OF PASS CHRISTIAN, MISSISSIPPI.

TIRE OR CASING SPREADING TOOL.

1,211,005.

Specification of Letters Patent.

Patented Jan. 2, 1917.

Application filed August 9, 1916. Serial No. 113,866.

*To all whom it may concern:*

Be it known that I, JOHN B. STROUD, a citizen of the United States, and a resident of Pass Christian, in the county of Harrison and State of Mississippi, have invented certain new and useful Improvements in Tire or Casing Spreading Tools, of which the following is a specification.

This invention relates to a tool for spreading tires or tire shoes or casings adapted for use in connection with automobile and other rubber tires, one object being to provide a device of the above class which is simple of construction, easily manipulated and inexpensive.

Another object is to provide a device by which an automobile or other rubber tire or shoe may be opened at any point and retained in such open condition while repairs are being made.

With these and other objects in view my invention consists in certain novel features of construction, arrangement and combination of parts as will hereinafter be fully described and pointed out in the claims, reference being had to the drawing in which similar reference characters are employed to designate corresponding parts throughout the several views, and in which—

Figure 1 is a side elevation of the device as in use. Fig. 2 is a vertical section on line 2—2 of Fig. 1. Fig. 3 is a horizontal section taken as on line 3—3 looking in the direction of the arrows.

In the drawings an automobile tire casing is shown at 10 having the usual bead edges 11 (see Fig. 2). The spreader comprises a base board 12 on which the tire or shoe is placed; perforated lugs or eyes 13 project at each side of the base board and may be made integral or in a thin plate 14 secured to the lower face of the base board. Flexible means such as chains 15 are secured at one end to the eyes 13 and the opposite ends are secured in eyes 16 projecting from a metal plate 17 which has a central screw threaded opening through which is threaded a shaft 18 the lower end of which has a head 19 swiveled to a follower or spreader plate 20 by the keeper 21; said keeper is secured to the upper face of the follower by bolts or screws 22; the follower is preferably of oblong form and at each corner is pivotally held a bar or arm 23 the lower end of each bar or arm being forked as indicated by 24. The upper ends of rods 23 are shown as pivoted between ears 25 carried by pins 26 inserted through the follower and held there by cotter pins 26 or other suitable means. Or the rods or arms 23 may be pivoted directly to the plate constituting the follower, or spreader plate. At the upper end of screw shaft 18 is fitted a hand wheel 28 by which said shaft is rotated. The upper plate 17 which forms a guide for screw-shaft may have reinforcing ribs $17^a$ on its under face and the central opening may be in the form of a cylindrical hub $17^b$. The follower plate 20 may also have strengthening or reinforcing ribs $20^a$ on its lower face and any suitable form of swivel connection may be used.

To use my device the base board is placed under the tire or shoe 10 and the chains connected to the base board and the top or guide plate. It is usually preferable to have one chain end detachable from the base board 12; after the chains are in position the forks 24 are caused to grasp or grip the bead edges of the tire and the hand wheel given the requisite number of turns to cause the follower to move downwardly; this causes the forked ends to spread outwardly at the side and thus spread and open the tire or shoe so that the whole of the inner surface may be exposed to make any necessary repairs. When the repairs have been made the upper end of one chain is released from the upper plate, the base board removed from beneath the tire or shoe and the tool removed.

It will be seen that I provide a simple, efficient and cheap device by means of which repairs can be quickly and readily made to the tire or shoe.

The follower or spreader plate may be of any suitable shape and size though it will generally be made elongated and of substantially oblong shape with the spreader arms pivotally connected thereto adjacent the corners. The inside of the forks 24 is roughened or provided with sharp teeth as at $24^a$ to prevent slipping when the casing is fully opened.

I claim:—

1. A tire or casing spreading device consisting of a supporting member for the tire or casing, an upper guide plate, flexible means connecting said plate and supporting member, a vertically movable spreader below said guide plate, divergent spreader arms suspended from said follower and adapted to engage the bead edge of a tire or casing, a shaft extending upwardly from said follower and vertically movable through said guide plate, and means for causing vertical movement of said shaft through the guide plate.

2. In a tire or casing spreading device, a tire supporting member, a guide plate, flexible means connecting said plate and supporting member, a shaft vertically movable through said guide plate, a spreader plate carried at the lower end of said shaft, divergent arms depending from said follower, said arms having forked lower ends to grip the bead edges of the tire or casing.

3. In a tire or casing spreading device, a tire supporting base, an upper guide plate having a threaded central opening, a threaded shaft fitted in said central opening, a spreader plate swiveled to the lower end of said threaded shaft, divergent arms extending downwardly from said swiveled plate, said arms having forked lower ends.

4. A tire casing spreading device consisting of a supporting base member, an upper guide member having a threaded central aperture, a threaded shaft fitted in said threaded aperture, a spreader plate swiveled to the lower end of said shaft, detachable flexible means connecting the supporting member and the guide plate, divergent spreader arms flexibly suspended from the spreader plate, and gripping means at the lower ends of the said arms for engaging the bead edge of the tire casing.

5. A tire casing spreading device, consisting of a lower supporting member and upper guide member having a central threaded opening therethrough, flexible means suspending the supporting member from the sides of guide member, a screw shaft carried in said threaded opening and having means at its upper end for rotating same, a spreader plate swiveled to lower end of said shaft, divergent spreader arms pivotally suspended from said spreader plate, and gripping means carried at the lower ends of said arms for engaging and spreading the edge of the casing when said spreader plate is moved downwardly by the screw shaft.

6. A tire casing spreading device consisting of a lower supporting member having lateral perforated lugs, an upper guide plate having a central opening therethrough, perforated lugs at the sides thereof, flexible means detachably engaging the lugs of the guide plate and supporting member, a manually operable screw shaft passing through the central opening of the guide plate, a spreader plate swiveled to the lower end of the screw shaft, spreader arms pivotally suspended from the spreader plate, said arms having gripping means at their lower ends.

7. A tire casing spreading device comprising a lower base or supporting member, an upper guide plate having a central threaded aperture, flexible means connecting the supporting member and the guide plate at the sides thereof, a screw shaft threaded through said central aperture, a substantially oblong spreader plate disposed between the guide plate and the supporting member and between the flexible connecting means, said spreader plate swiveled to the lower end of the screw shaft, and spreader arms pivotally suspended from the spreader plate adjacent the corners thereof, said arms being forked at their lower ends to grip the bead edge of a casing.

JNO. BELL STROUD.

Witnesses:
REBELLIA A. BRANDT STROUD,
ANNA M. BRANDT.